US008472425B2

(12) United States Patent
Venkatachalam et al.

(10) Patent No.: US 8,472,425 B2
(45) Date of Patent: Jun. 25, 2013

(54) SYSTEM, METHOD AND APPARATUS FOR AN EFFICIENT INFORMATION BROADCAST IN A MULTI-CARRIER WIRELESS NETWORK

(75) Inventors: Muthaiah Venkatachalam, Beaverton, OR (US); Xiangying Yang, Portland, OR (US); Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 12/789,098

(22) Filed: May 27, 2010

(65) Prior Publication Data

US 2011/0044213 A1 Feb. 24, 2011

Related U.S. Application Data

(60) Provisional application No. 61/275,266, filed on Aug. 24, 2009.

(51) Int. Cl.
*H04J 1/00* (2006.01)
*H04L 12/28* (2006.01)

(52) U.S. Cl.
USPC ............ 370/343; 370/390; 370/480; 370/482

(58) Field of Classification Search
None
See application file for complete search history.

(56) References Cited

U.S. PATENT DOCUMENTS

| 2006/0135141 | A1* | 6/2006 | Wilson et al. ................. 455/418 |
| 2008/0261573 | A1 | 10/2008 | Kuo |
| 2009/0109914 | A1* | 4/2009 | McBeath et al. .............. 370/329 |
| 2010/0220674 | A1* | 9/2010 | Fu ................................ 370/329 |
| 2010/0272051 | A1* | 10/2010 | Fu et al. ....................... 370/329 |

FOREIGN PATENT DOCUMENTS

| WO | 2008032999 | 3/2008 |
| WO | 2010044627 | 4/2010 |

OTHER PUBLICATIONS

Youngsoo Yuk et al.,"Procedures for Multicarrier Support", IEEE C802.16m-08/1160r1, Sep. 9, 2008.
International Search Report and Written Opinion received for PCT Patent Application No. PCT/US2010/046286, mailed Apr. 29, 2011, 9 pgs.

* cited by examiner

*Primary Examiner* — Yemane Mesfin
*Assistant Examiner* — Christine Duong
(74) *Attorney, Agent, or Firm* — Kacvinsky Daisak PLLC

(57) ABSTRACT

Embodiments of an apparatus, system and method are described for a base station. Notification from a mobile station in a network may be received. A multi-carrier advertisement with a base station multi-carrier configuration may be sent. The base station multi-carrier configuration may include at least one carrier index associated with a carrier frequency operated on by the base station. Other embodiments are described and claimed.

17 Claims, 6 Drawing Sheets

SYSTEM, METHOD AND APPARATUS FOR AN EFFICIENT INFORMATION BROADCAST IN A MULTI-CARRIER WIRELESS NETWORK

PRIORITY INFORMATION

This application claims priority to the commonly-owned co-pending provisional patent application U.S. Ser. No. 61/275,266, entitled "Advanced Broadband Wireless Communication Systems and Methods", filed Aug. 24, 2009.

BACKGROUND

Base stations often only support a single frequency carrier as each mobile station operates on only one frequency. For example, a base station may support a 2.4 GHz, 2.5 GHz or 400 MHz frequency. Base stations support the single frequency by responding to pre-provisioning, over-the-air provisioning or unicast operation and frequently broadcasting messages with all the relevant carrier frequency information. These messages are typically long and are designed to carry detailed confirmation information.

As mobile stations are being created to operate on multiple frequencies, the base stations may also operate on multiple frequencies. If the base stations continue to broadcast detailed configuration information for each of the various carrier frequencies they support, however, the bandwidth of the broadcasts will become too large and use up too much airspace. Consequently, there exists a substantial need for efficient techniques for system information broadcast in a multi-carrier wireless network.

DETAILED DESCRIPTION

The embodiments are generally directed to techniques designed to allow a fixed network access point, such as a base station, with multiple carrier frequencies to broadcast the various frequencies to mobile stations while allowing the broadcast to maintain flexibility and use reduced bandwidth. Various embodiments provide techniques for receiving notification from a mobile station in a network. A multi-carrier advertisement with a base station multi-carrier configuration may be sent. The base station multi-carrier configuration may include at least one carrier index associated with a carrier frequency operated on by the base station.

Base stations may support multi-carrier operations and therefore may communicate with mobile stations on various carrier frequencies. In a 4G wireless standard, such as the Institute of Electrical and Electronics Engineers (IEEE) 802.16m and the $3^{rd}$ Generation Partnership Project (3GPP) Long Term Evolution Advanced (LTE ADV) standards, multi-carrier operation may support larger bandwidths and meet International Mobile Telecommunications Advanced (IMT-ADV) specifications for system capacity. Each base station in a network may use different carrier frequencies. The base stations may be configured with different carrier frequencies according to factors such as, but not limited to, the available technology and regional market demand.

Sending out detailed broadcasts for each carrier frequency used or supported by a base station would consume a lot of overhead and be very complex. The various embodiments described herein may create an efficient method for system information to be broadcast in a multi-carrier wireless network. The various embodiments described herein may reduce airlink overhead, reduce mobile station complexity and maintain flexibility to handle various deployment scenarios.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
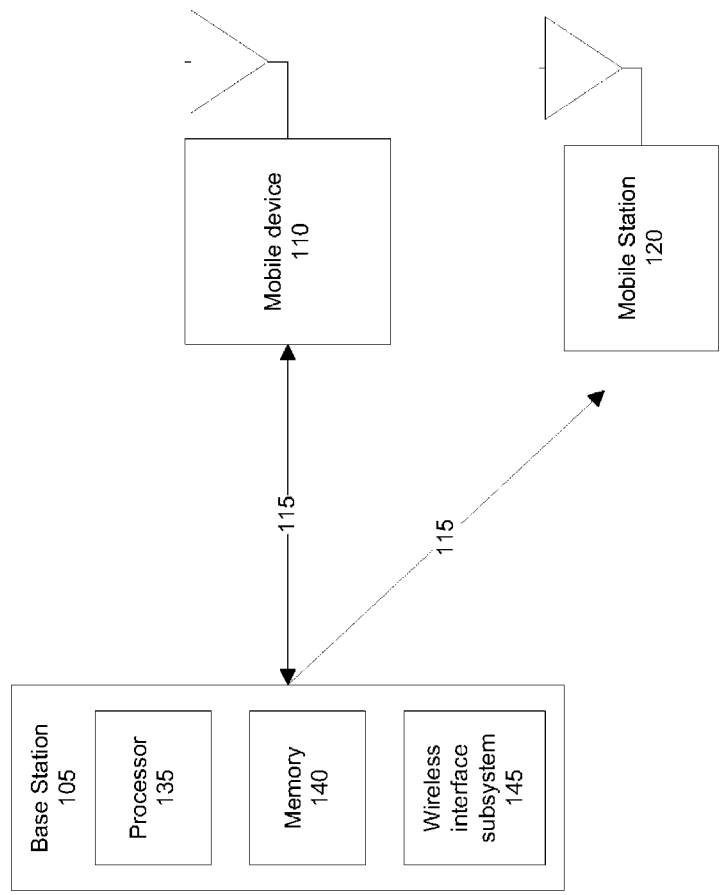
FIG. 1 illustrates one embodiment an exemplary block diagram of a multi-carrier wireless network communication system.

FIG. 1 illustrates one embodiment of an exemplary block diagram of a multi-carrier wireless network communications system. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wireless communication links, such as wireless shared media 115. Examples of a wireless communication link may include, without limitation, a Wireless Fidelity (WiFi) channel, operating in one or more licensed or license-free frequency bands. The wireless nodes may include one or more wireless interface subsystems and/or components for wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple elements, such as a base station 105 and mobile stations 110, 120. As shown by base station 105, the base station 105 may include a processor 135, a memory unit 140, and a wireless interface subsystem 145. The embodiments, however, are not limited to the elements shown in FIG. 1.

In various embodiments, the communications system 100 may comprise or be implemented as a mobile broadband communications system. Examples of mobile broadband communications systems include without limitation systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with the 802.11z TGz task group, IEEE 802.11z proposed standard.

In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e Cor2/D3-2005) are Physical (PHY) layer specifications. WiMAX II is an advanced Fourth Generation (4G) system based on the IEEE 802.16m and IEEE 802.16j proposed standards for International Mobile Telecommunications (IMT) Advanced 4G series of standards. Although some embodiments may describe the communications system 100 as a WiMAX or WiMAX II system or standards by way of example and not limitation, it may be appreciated that the communications system 100 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, 3rd Generation Partnership Project (3GPP) Rel. 8 and 9 of Long Term Evolution (LTE)/System Architecture Evolution (SAE) and so forth. The embodiments are not limited in this context.

In various embodiments, the communications system 100 may comprise mobile stations 110, 120 having wireless capabilities. The mobile stations 110, 120 may comprise a generalized equipment set providing connectivity to other wireless devices, such as other mobile stations or base stations (e.g., base station 105). Examples for the mobile stations 110, 120 may include without limitation a computer, server, workstation, notebook computer, handheld computer, telephone, cellular telephone, personal digital assistant (PDA), combination cellular telephone and PDA, and so forth. In one embodiment, for example, the mobile stations 110, 120 may be implemented as mobile subscriber stations (MSS) for a WMAN. Although some embodiments may be described with the mobile stations 110, 120 implemented as a MSS by way of example, it may be appreciated that other embodiments may be implemented using other wireless devices as well. The embodiments are not limited in this context.

In various embodiments, the communications system 100 may comprise a base station 105 having wireless capabilities. A base station 105 may comprise a generalized equipment set providing connectivity and/or information to another wireless device, such as one or more mobile stations 110, 120. Examples for the base station 105 may include, but are not limited to, a wireless access point (AP), base station or node B, router, switch, hub and/or gateway. In one embodiment, the base station 105 may include two or more of the above devices located within the same network. For example, a base station 105 may include two access points located in the same provider network. The two access points may have the same service set identifier (SSID). Although some embodiments may be described with the base station 105 implemented as an access point, by way of example, it may be appreciated that other embodiments may be implemented using other wireless devices as well. The embodiments are not limited in this context.

The base station 105 may include a processor 135, a memory unit 140 and a wireless interface subsystem 145. The processor 135 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 135 may be implemented as a general purpose processor, such as a processor made by Intel® Corporation, Santa Clara, Calif. The processor 135 may be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the base station 105, the base station 105 may comprise a memory unit 140. The memory 140 may comprise any machine-readable or computer-readable media capable of storing data, including both volatile and non-volatile memory. For example, the memory 140 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 140 may be included on the same integrated circuit as the processor 135, or alternatively some portion or all of the memory 140 may be disposed on an integrated circuit or other medium, for example a hard disk drive, that is external to the integrated circuit of the processor 135. In one embodiment, the memory may include data and instructions to operate the processor. The embodiments are not limited in this context.

In various embodiments, the base station 105 may communicate information over wireless shared media 115 via a wireless interface subsystem 145. The wireless shared media 115 may comprise one or more allocations of RF spectrum. The allocations of RF spectrum may be contiguous or non-contiguous. In some embodiments, the wireless interface subsystem 145 may communicate information over the wireless shared media 115 using various multi-carrier techniques utilized by, for example, WiMAX or WiMAX II systems or WLAN systems. For example, the wireless interface subsystems 145 may utilize various Multiple-Input Multiple-Output (MIMO) techniques.

In one embodiment, a mobile station 110 may acquire a multi-carrier configuration and a configuration version number via a variety of different ways. In one embodiment, a mobile station may store the network multi-carrier confirmation and its associated operator identification either through pre-provisioning, over-the-air provision or unicast operations from a base station 105 during the first network entry of the mobile station 110. In one embodiment, provisioning may occur when an operator programs hardware in the mobile station 110 prior to selling the mobile station. For example, a mobile station 110, such as, but not limited to, a mobile phone, may have hardware programmed inside prior to purchase.

In one embodiment, a unicast operation may occur when a mobile station 110 is first turned on and enters a network. A base station 105 in the network may determine the current version number of the mobile station 110. The base station 105 may receive the version number of the mobile station 110. If the version number of the mobile station 110 is different than the version of the base station 105, the base station 105 may send the mobile station 110 a unicast response with updated information to overwrite the old version stored in the mobile station 110.

In one embodiment, an over-the-air provision may occur when the base station 105 sends an update message to the mobile station 110. The mobile station 110 may enter the network and may update and check the version number to ensure that it matches with the version number of the base station 105. If the version number of the mobile station 110 is different than the version of the base station 105, the base station 105 may send the mobile station 110 a response with updated information to overwrite the old version stored in the mobile station 110.

While each of the methods described above allow the mobile station 110 to communicate with a base station 105, these methods are designed for cases where the base station 105 is static over a long period of time and is consistent across the same operator network. As a base station 105 may have multiple carriers and often dynamically changing frequencies, a new way to communicate with mobile stations 110, 120 may be provided which reduces airlink overhead and reduces mobile station 110, 120 complexities while still maintaining enough flexibility to hand numerous possible deployment scenarios.

In one embodiment, a base station 105 may broadcast a multi-carrier configuration, such as, a multi-carrier advertisement, so that all connected mobile stations 110, and any mobile stations 120 entering the cell, may obtain the latest information over the air. In one embodiment, the broadcast multi-carrier advertisement may include a version number compatible with the provisioning, over the air provision and/or unicast operations.

Figure 2:
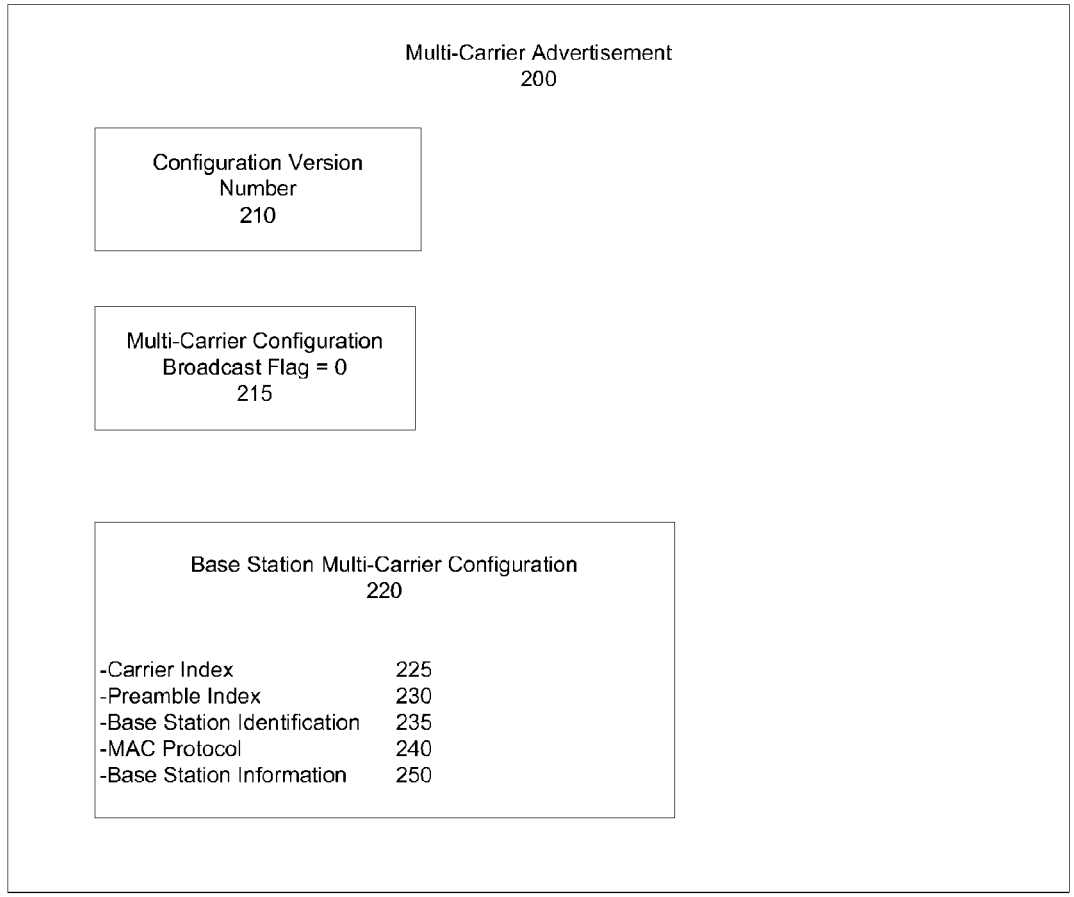
FIG. 2 illustrates one embodiment of an exemplary multi-carrier advertisement.

FIG. 2 illustrates one embodiment of an exemplary multi-carrier advertisement. The multi-carrier advertisement 200 comprises a configuration version number 210. The configuration version number 210, as discussed with the provisioning, over the air provision and unicast operations, is for network configuration. The configuration version number 210 may be used to ensure that the mobile station has updated information.

In one embodiment, the base station may send the multi-carrier advertisement 200 and include the base station multi-carrier configuration 220 in its downlink control. In one embodiment, the information in the base station multi-carrier configuration 220 may be kept as small and simple as possible so that the base station remains flexible in both the format of the multi-carrier advertisement and the broadcast schedule so that the multi-carrier advertisement 200 only consumes a relatively small amount of bandwidth. In one embodiment, for backward compatibility and complexity reduction, each carrier may have their own MAC operation associated 48 bit base station identification.

The multi-carrier advertisement 200 may include a base station multi-carrier configuration 220. The base station multi-carrier configuration 220 may include a carrier index 225, a preamble index 230, a base station identification 235, a MAC protocol 240, and other base station information. In one embodiment, the base station multi-carrier configuration 220 may include, but is not limited to, a transmission power and random access opportunities.

For each carrier index 225, a multi-carrier index or a configuration parameter may be provided. Additionally, a start frequency assignment index may show the frequency of a first carrier in a carrier group. The carrier index may also provide the number of carriers within that particular carrier index. For example, a carrier index for frequency 2.4 GHz may include 2 carriers in a band while the carrier index for frequency 700 MHz may include 4 carriers in a band. As discussed in the embodiments below, "carrier frequency" will refer to all carriers within a particular frequency band.

A base station multi-carrier configuration information 220 may include the one or more carrier indexes 225 that are used or operated on by the base station. In one embodiment, a network, in which the base station may be location, may contain ten carrier frequencies. However, the base station may only use two of the ten carrier frequencies. Accordingly, the base station multi-carrier configuration 220 will include the carrier index 225 of the two carrier frequencies which are operated on or used by the base station.

In one embodiment, a global network configuration may be determined. A global network configuration may include parameters associated with each carrier within a band. For example, a network may deploy WiMAX in 2.4 GHz band, as required by FCC running Time-division 4G technology. The network may have base stations configured with carriers within the 2.4 GHz band to be 10 MHz each. In one embodiment, 10 carriers may be created in this band. The network may refer to each carrier by the carrier index and the associated carrier-specific parameters. As 10 carriers may be created within the band, there may be 10 carrier indexes. Each carrier, including the carrier index and the associated carrier-specific parameters, may be defined in the global network configuration and may be included in the multicarrier advertisement 200, 300 and/or the neighbor base station advertisement 400.

The base station multi-carrier configuration 220 may include the carrier index 225 for each of the carrier frequencies associated with the base station. The carrier index 225 may be one or more numbers, letters, symbols or other shorthand representation to identify the carrier frequency. In one embodiment, a mobile station may obtain the configuration of the carrier frequencies though a multi-carrier advertisement which also includes a network multi-carrier configuration. The network multi-carrier configuration may include all the detailed configuration information for the carriers within the network while the base station multi-carrier configuration 220 may include the one or more carrier indexes 225 which identify the particular carrier frequencies used by the base station.

Figure 3:
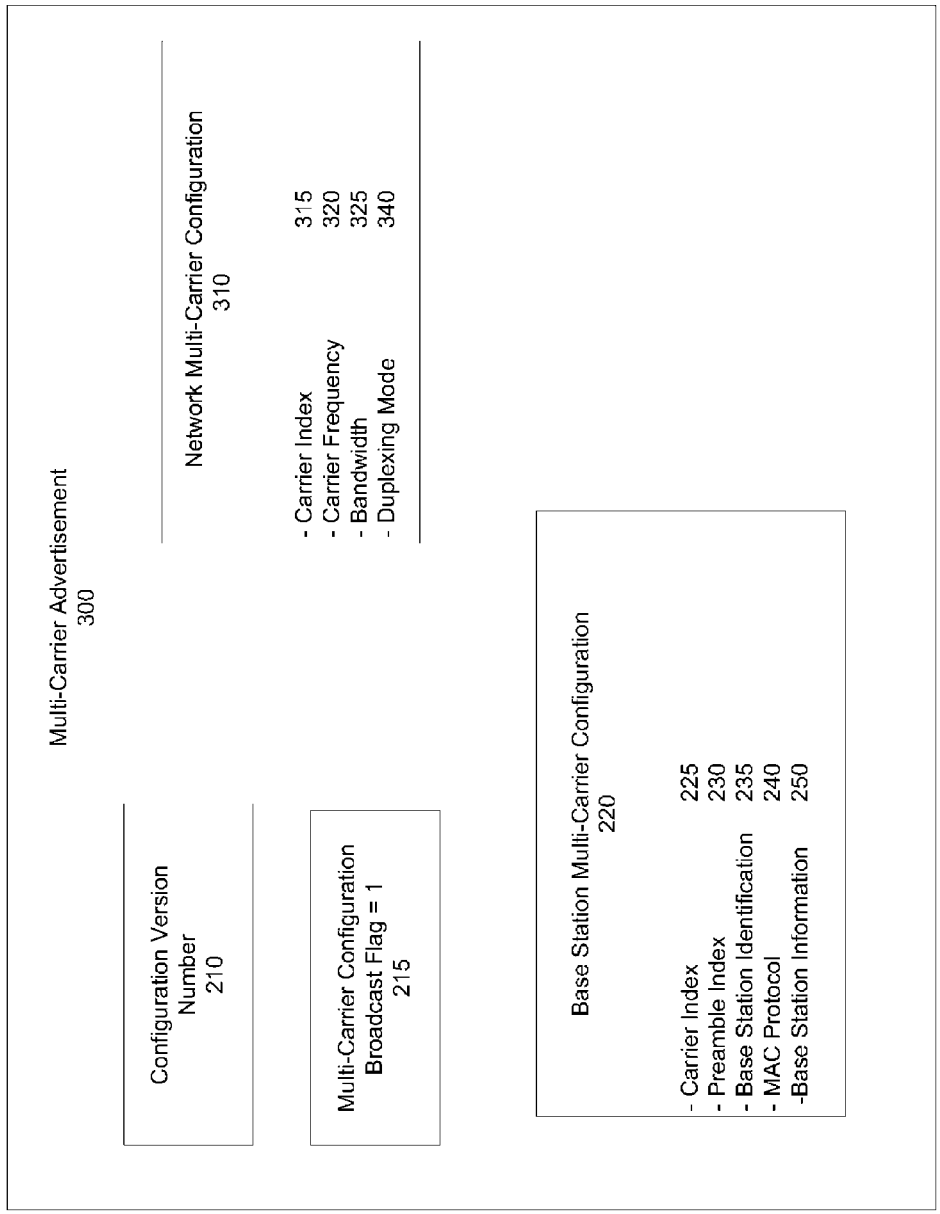
FIG. 3 illustrates one embodiment of an exemplary multi-carrier advertisement with network multi-carrier configuration information.

FIG. 3 illustrates one embodiment of an exemplary multi-carrier advertisement with network multi-carrier configuration information. FIG. 3 depicts a multi-carrier advertisement 300 with both a bases station multi-carrier configuration and a network multi-carrier configuration 310. In one embodiment, the network multi-carrier configuration 310 may only be included in the multi-carrier advertisement when the multi-carrier configuration broadcast flag 215 is set to 1. In one embodiment, the network multi-carrier configuration information 310 is not provided in each multi-carrier advertisement 300. The multi-carrier configuration broadcast flag 215 may be set to 0 (as shown in FIG. 2) and not include the network multi-carrier configuration 310 in order to increase the flexibility of the broadcast and/or consume less bandwidth.

In one embodiment, the multi-carrier configuration broadcast flag 215 may be set to 1 and/or may cause the network multi-carrier configuration 310 to be included in the multi-carrier advertisement 300 after a threshold. In one embodiment, the threshold may be based on the number of times the multi-carrier advertisement is sent out without the network multi-carrier configuration information. For example, the network multi-carrier configuration 310 may be included after the tenth time the multi-carrier advertisement 300 is sent out without the network multi-carrier configuration. For example, the network multi-carrier configuration 310 may be included after the fiftieth time the multi-carrier advertisement is sent out without the network multi-carrier configuration. For example, the network multi-carrier configuration 310 may be included after the one hundredth time the multi-carrier advertisement is sent out without the network multi-carrier configuration. In one embodiment, the threshold may be determined based on time elapsed. For example, the base station advertisement may be sent every 1-5 minutes without the network multi-carrier configuration and the network multi-carrier configuration 310 may be included in the base station advertisement every 10-20 minutes.

Unlike the base station multi-carrier configuration 220 which just includes at least one carrier index 225 used by the base station, the network multi-carrier configuration information 310 may include all the detailed network configuration information for each of the various carrier frequencies within the network. In one embodiment, the network multi-carrier configuration may include carrier-specific parameters, such as, but not limited to, a carrier index 315, carrier frequency 320, a bandwidth 325 and/or a duplexing mode 340. In one embodiment, the network multi-carrier confirmation may include more or less parameters. In one embodiment, the carrier index may be defined by the global network configuration. In one embodiment, the associated carrier-specific parameters, such as, but not limited to, a carrier frequency 320, a bandwidth 325 and/or a duplexing mode 340, may be defined by the global network configuration.

The network multi-carrier configuration may include a carrier index 315 for each carrier frequency in the network. The carrier index 310 in the network multi-carrier configuration 310 may correspond to the carrier index 225 in the base station multi-carrier configuration 220, depicted in FIG. 2 and FIG. 3. Based on the carrier index 225 provided in the base station multi-carrier configuration 220, the mobile station can obtain the detailed configuration information for the particular carrier frequency associated with the carrier index 315 in the network multi-carrier configuration 310. Along with each carrier index 315 will include the carrier frequency 320. The carrier frequency may be, but is not limited to, 2.4 GHz, 2.5 GHz and/or 700 MHz.

In one embodiment, a mobile station may not need the information provided in the network multi-carrier configuration 310 in the multi-carrier advertisement 300. In one embodiment, the mobile station may not need the information in the network multi-carrier configuration 310 because it received an earlier broadcast with the configuration information related to the carrier index 315. In one embodiment, the mobile station may not need the information in the network multi-carrier configuration 310 because the mobile station may have received all the carrier configuration information during pre-provisioning, unicast operations and/or over-the-air provisioning.

Figure 4:
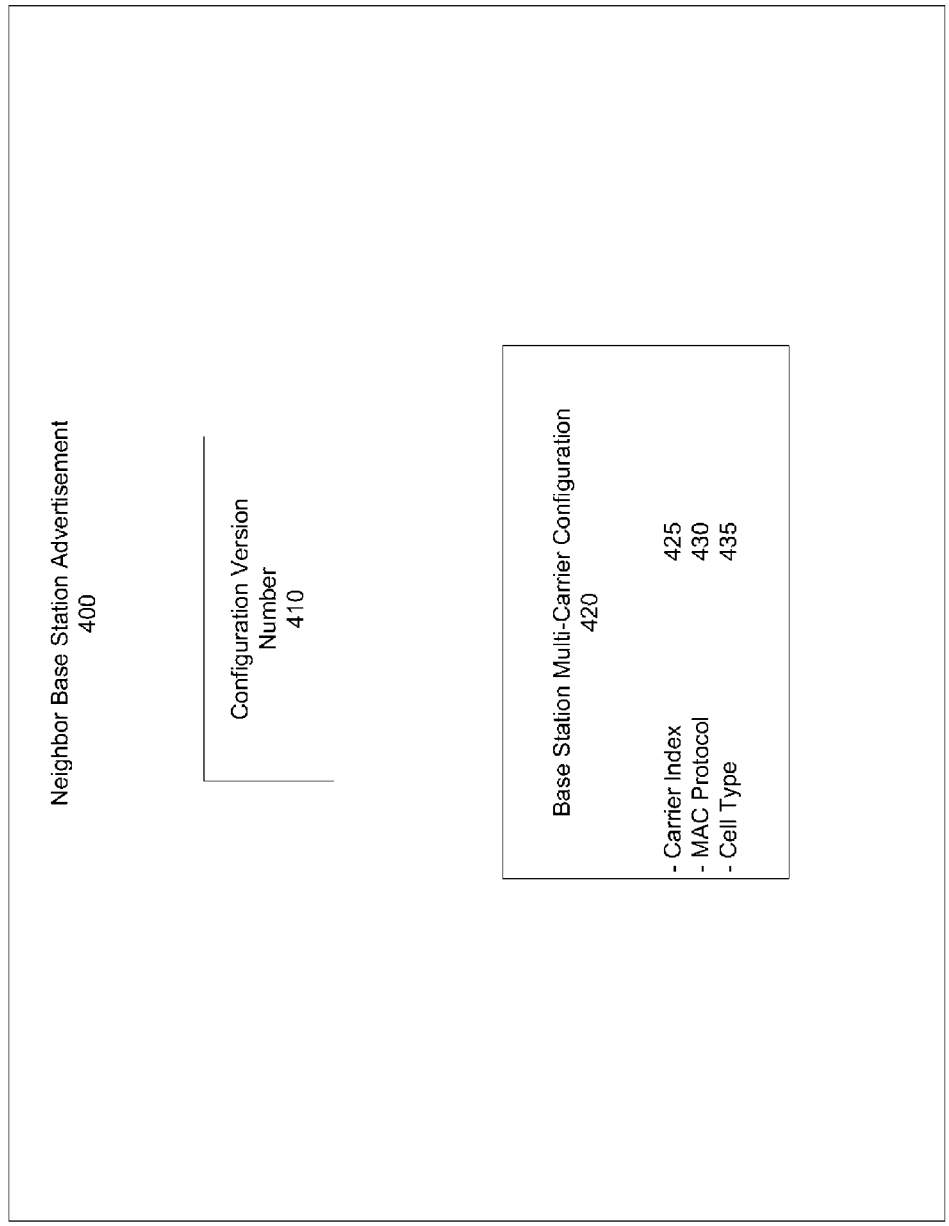
FIG. 4 illustrates one embodiment of an exemplary neighbor base station advertisement.

FIG. 4 illustrates one embodiment of an exemplary neighbor base station advertisement. The neighbor base station advertisement may be used to allow mobile stations currently interacting with a base station to learn about the carrier frequencies used by a neighboring base station. A mobile station may be searching for neighboring base stations for future handovers. The mobile station may determine which neighbor base stations operate on a particular carrier frequency. In one embodiment, the neighbor base station advertisement 400 may include a carrier index 425, a MAC protocol 430, a cell type 435 and/or other information which may be used by a mobile station. In one embodiment, the carrier index 425 may refer to the same carrier index 425 in the base station multi-carrier configuration 220 and the network multi-carrier configuration 310 as shown in FIG. 2 and FIG. 3. In one embodiment, the neighbor base station multi-carrier advertisement 400 may include the carrier indexes 425 on which the neighbor base station operates. By using the carrier index 425, the neighbor base station advertisement 400 may reduce overhead and may be efficient as it only needs to provide the carrier index and does not need to include the carrier frequency configuration information. In one embodiment, the MAC protocol 430 may include an IEEE 802.16m base station, an IEEE 802.16e base station and/or an IEEE 802.16e/16m mixed mode base station. In one embodiment, the cell type 435 may include a macro/pico cell type and/or a public/private cell type.

Figure 5:
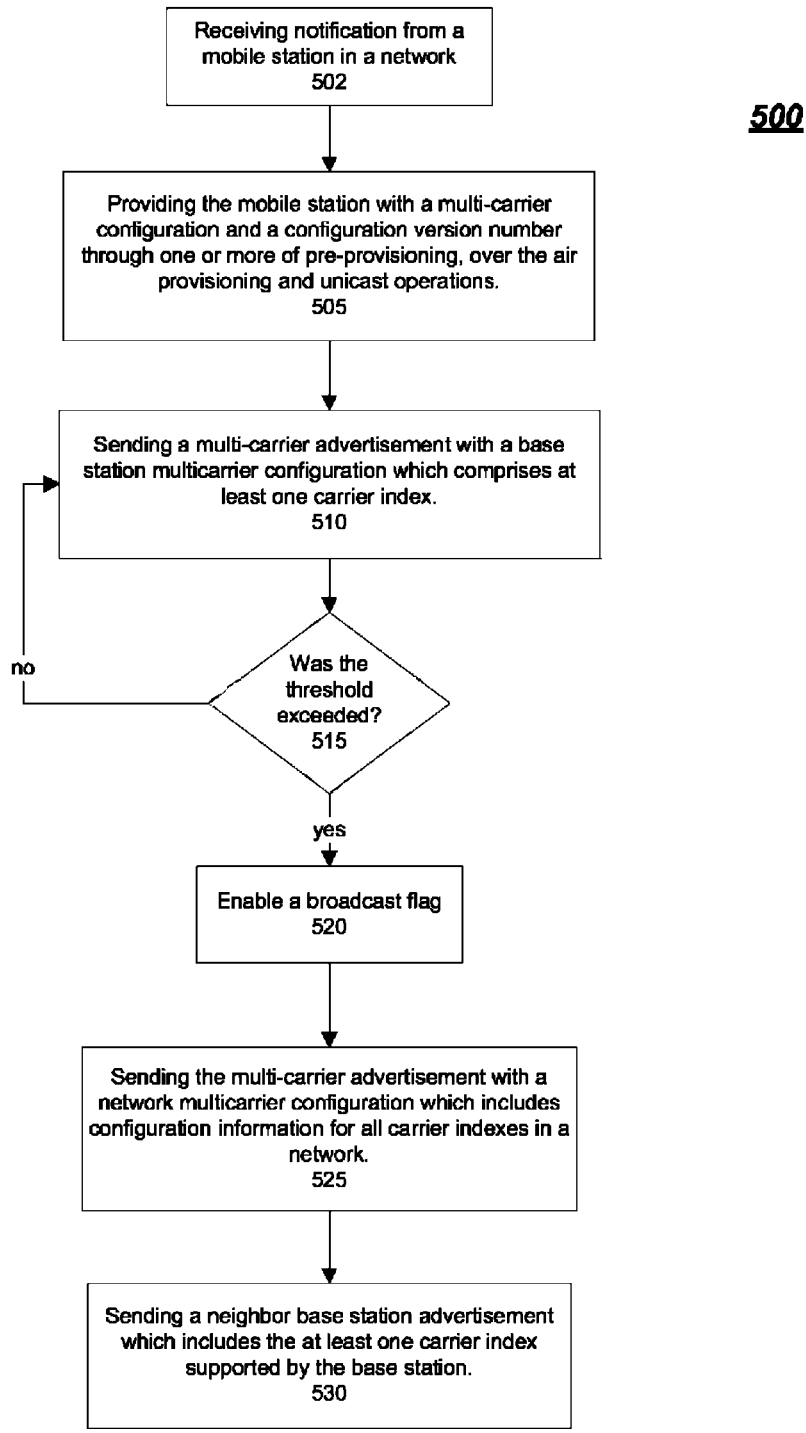
FIG. 5 illustrates one embodiment of an exemplary logic diagram.

FIG. 5 illustrates one embodiment of an exemplary logic diagram. The logic flow 500 may be performed by various systems and/or devices and may be implemented as hardware, software, firmware, and/or any combination thereof, as desired for a given set of design parameters or performance constraints. For example, one or more operations of the logic flow 500 may be implemented by executable programming or computer-readable instructions to be executed by a logic device (e.g., computer, processor). Logic flow 500 may describe the features described above with reference to system 100.

In one embodiment, the base station may receive at block 502 notification from a mobile station in a network. In an embodiment, a notification may be received when the mobile stations enters a network. The base station may send at block 505 the mobile station a multi-carrier configuration and a configuration version number through one or more of pre-provisioning, over the air provisioning and/or unicast operations.

In an embodiment, a multi-carrier advertisement may be generated by a base station for communication to a mobile station over a network. The base station may send at block 510 the multi-carrier advertisement with a base station multi-carrier configuration. In one embodiment, the base station multi-carrier configuration may include at least one carrier index. In one embodiment, the at least one carrier index used by the base station may include one, some or all of the carrier indexes in a network. In one embodiment, the carrier indexes included in the multi-carrier advertisement are the one or more carrier indexes for the carrier frequencies used by the base station.

In one embodiment, the base station may determine at diamond 515 if a threshold has been exceeded. After the multi-carrier advertisement has exceeded a threshold, a broadcast flag may be enabled at block 520. When the broadcast flag is enabled at block 520, the base station may send at block 525 a network multi-carrier configuration in the multi-carrier advertisement. The network multi-carrier configuration may include configuration information for all carrier indexes in the network.

In one embodiment, in addition to sending multi-carrier advertisements to current mobile stations, the base station may send at block 530 a neighbor base station advertisement to possible future mobile stations. In one embodiment, the neighbor base station advertisement may be sent to mobile stations which are currently communication with nearby base stations. In one embodiment, the base station may send at block 530 a neighbor base station advertisement which may include at least one carrier index supported and/or operated on by the base station.

Referring to FIG. 5, it should be understood that in some embodiments that logic flow 500 may be implemented or arranged to perform tasks in parallel, including processing a plurality of threads and controlling a plurality of cores at substantially the same time. Moreover, it should also be understood that the logic flow 500 is only one example of a logic flow and that different numbers, orders and/or arrangements of the operations described in logic flow 500 could be implemented and still fall within the described embodiments. Other embodiments are described and claimed.

Figure 6:
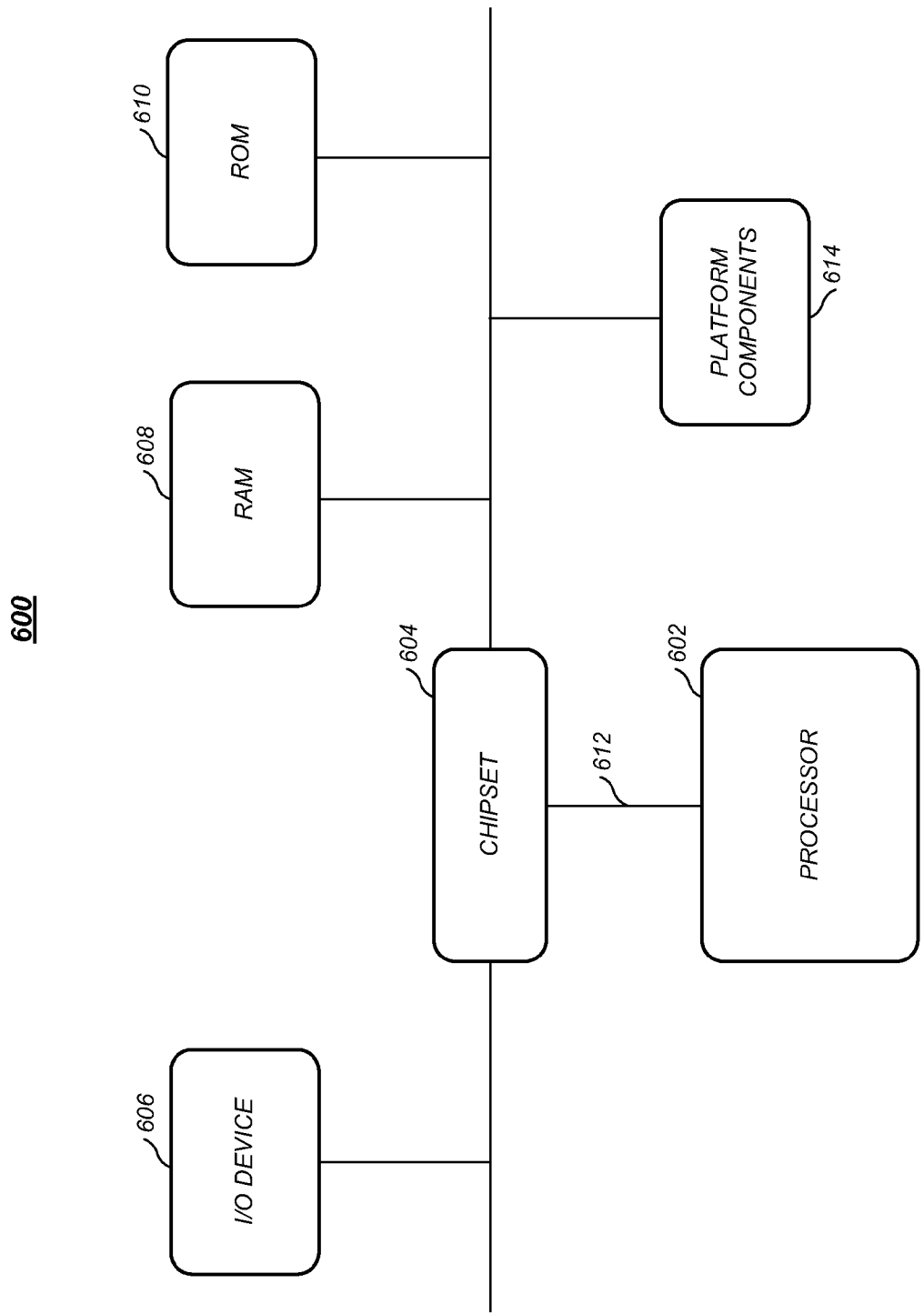
FIG. 6 illustrates one embodiment of a diagram of an exemplary system.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, central processing unit (CPU), multi-processing unit, a reduced instruction set computer (RISC), a processor that have a pipeline, a complex instruction set computer (CISC), a digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 600 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a non-transitory computer-readable storage medium containing instructions that when executed by a processor enable a system to:
receive a notification from a mobile station in a network;
provide the mobile station with a configuration version number;
send a multi-carrier advertisement with the configuration version number and a base station multi-carrier configuration which comprises at least one carrier index associated with a carrier frequency operated on by a base station, the multi-carrier advertisement sent without a network multi-carrier configuration when a broadcast flag is disabled;
enable the broadcast flag when a time period after sending the multi-carrier advertisement without the network multi-carrier configuration exceeds a threshold amount; and
send the multi-carrier advertisement with the network multi-carrier configuration when the broadcast flag is enabled.

2. The article of claim 1, wherein the network multi-carrier configuration comprises configuration information for all carrier indexes in the network.

3. The article of claim 1, comprising instructions that when executed provide the mobile station with the configuration version number through one or more of pre-provisioning, over the air provisioning and unicast operations.

4. The article of claim 1, comprising instructions that when executed enable the base station to send a neighbor base station advertisement which includes the at least one carrier index operated on by the base station, wherein the at least one carrier index is defined by a global network configuration.

5. The article of claim 1, wherein the at least one carrier index is defined by a global network configuration.

6. The article of claim 1, wherein the network multi-carrier configuration comprises one or more carrier-specific parameters of a carrier frequency associated with each carrier index.

7. The article of claim 1, wherein the network multi-carrier configuration comprises one or more of a bandwidth and a duplexing mode.

8. The article of claim 1, wherein the base station multi-carrier configuration comprises one or more of a preamble index and a Medium Access Control (MAC) protocol.

9. The article of claim 1, wherein the base station multi-carrier configuration comprises a base station identification.

10. A method comprising:
generating a plurality of multi-carrier advertisements by a base station for communication to a mobile station over a network;
sending a first multi-carrier advertisement with a base station multi-carrier configuration which comprises at least one carrier index when a broadcast flag is disabled, the first multi-carrier advertisement sent without a network multi-carrier configuration;
enabling the broadcast flag when a time period after sending the first multi-carrier advertisement without the network multi-carrier configuration exceeds a threshold amount; and
sending a second multi-carrier advertisement with the base station multi-carrier configuration and the network multi-carrier configuration when the broadcast flag is enabled, wherein the network multi-carrier configuration comprises configuration information for all carrier indexes in the network.

11. The method of claim 10, wherein the at least one carrier index is associated with a carrier frequency used by the base station.

12. The method of claim 10, comprising providing the mobile station with a multi-carrier configuration and a configuration version number through one or more of pre-provisioning, over the air provisioning and unicast operations.

13. The method of claim 10, comprising sending a neighbor base station advertisement which includes the at least one carrier index, wherein the at least one carrier index is defined by a global network configuration.

14. A system, comprising:
a base station to:
receive a notification from a mobile station in a network,
send a multi-carrier advertisement with a base station multi-carrier configuration which comprises at least one carrier index associated with a carrier frequency operated on by the base station and the at least one carrier index is defined by a global network configuration, the multi-carrier advertisement sent without a network multi-carrier configuration when a broadcast flag is disabled;
enable the broadcast flag when a time period after sending the multi-carrier advertisement without the network multi-carrier configuration exceeds a threshold amount; and
send the multi-carrier advertisement with the network multi-carrier configuration when the broadcast flag is enabled.

15. The system of claim 14, wherein the network multi-carrier configuration comprises configuration information for all carrier indexes in the network.

16. The system of claim 14, wherein the base station is to provide the mobile station with a multi-carrier configuration and a configuration version number through one or more of pre-provisioning, over the air provisioning and unicast operations.

17. The system of claim 14, wherein the base station comprises an input/output device connected to a digital display.

* * * * *